US011833767B2

(12) United States Patent
Froebel et al.

(10) Patent No.: US 11,833,767 B2
(45) Date of Patent: Dec. 5, 2023

(54) METHOD FOR PRODUCING FIBER-REINFORCED PLASTICS

(71) Applicant: Covestro Intellectual Property GmbH & Co. KG, Leverkusen (DE)

(72) Inventors: Sascha Froebel, Düsseldorf (DE); Benedikt Kilian, Düsseldorf (DE); Bolko Raffel, Dormagen (DE); Dirk Bruening, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 266 days.

(21) Appl. No.: 17/607,193

(22) PCT Filed: Apr. 24, 2020

(86) PCT No.: PCT/EP2020/061427
§ 371 (c)(1),
(2) Date: Oct. 29, 2021

(87) PCT Pub. No.: WO2020/221661
PCT Pub. Date: Nov. 5, 2020

(65) Prior Publication Data
US 2022/0219412 A1 Jul. 14, 2022

(30) Foreign Application Priority Data
Apr. 29, 2019 (EP) ................................ 19171509

(51) Int. Cl.
*B29C 70/52* (2006.01)
(52) U.S. Cl.
CPC .................. *B29C 70/523* (2013.01)

(58) Field of Classification Search
CPC ... B29C 70/526; B29C 70/523; B29C 70/521; B29C 70/52; B29C 70/50
See application file for complete search history.

(56) References Cited

U.S. PATENT DOCUMENTS

| | | | | |
|---|---|---|---|---|
| 5,098,496 A | * | 3/1992 | Breitigam | B29C 70/521 264/237 |
| 5,556,496 A | * | 9/1996 | Sumerak | B29C 70/525 156/166 |
| 6,408,915 B1 | * | 6/2002 | Ballata | B29C 70/526 156/441 |

FOREIGN PATENT DOCUMENTS

| | | |
|---|---|---|
| EP | 0712716 A1 | 5/1996 |
| EP | 3466659 A1 | 4/2019 |

OTHER PUBLICATIONS

Joshi, S.C., Y.C. Lam, U.W. Tun, Improved cure optimization in pultrusion with pre-heating and die-cooler temperature, Composites: Part A, vol. 34 (2003), pp. 1151-1159. (Year: 2003).*

Coelho, R.M.L. and M.A. Calado, An optimization Procedure for the Pultrusion Process Based on a Finite Element Formulation, Polymer Composites, vol. 23, No. 3 (Jun. 2002), pp. 329-341. (Year: 2002).*

(Continued)

*Primary Examiner* — Matthew J Daniels
(74) *Attorney, Agent, or Firm* — Donald R. Palladino

(57) ABSTRACT

The invention relates to a pultrusion method for producing fiber-reinforced plastics, to carrying said method out by computer-assisted simulation and to a suitable underlying thermodynamic model.

7 Claims, 1 Drawing Sheet

(56) References Cited

OTHER PUBLICATIONS

Carlone, P., G.S. Palazzo, R. Pasquino, Pultrusion manufacturing process development: Cure optimization by hybrid computational methods, Computers and Mathematics with Applications, vol. 53 (2007), pp. 1464-1471. (Year: 2007).*
Baran, I., J.H. Hattel, C.C. Tutum, Thermo-Chemical Modelling Strategies for the Pultrusion Process, Appl. Compos. Mater., vol. 20 (2013), pp. 1247-1263. (Year: 2013).*
Baran, I., C.C. Tutum, J.H. Hattel, R. Akkerman, Pultrusion of a vertical axis wind turbine blade part-I: 3D thermo-chemical process simulation, Int. J. Mater. Form, vol. 8 (2015), pp. 379-389. (Year: 2015).*
Kilian, B. S. Frobel, D. Bruning, Towards Process Optimisation of Polyurethane Pultrusion Using 3D Simulation, in Advances in Polymer Processing 2020 (2020), pp. 167-176. (Year: 2020).*
Baran, I., C.C. Tutum, J.H. Hattel, Optimization of the Thermosetting Pultrusion Process by Using Hybrid and Mixed Integer Genetic Algorithms, Appl. Compos. Mater., vol. 20 (2013), pp. 449-463. (Year: 2013).*
De Cassia Costa Dias, R., L.d.S.S. Lizandro, H. Ouzia, R. Schledjewski, Improving degree of cure in pultrusion process by optimizing die-temperature, Materials Today Communications, vol. 17 (2018), pp. 362-370. (Year: 2018).*
International Search Report, PCT/EP2020/061427, dated Aug. 11, 2020, Authorized officer: Milan Makuch.

\* cited by examiner

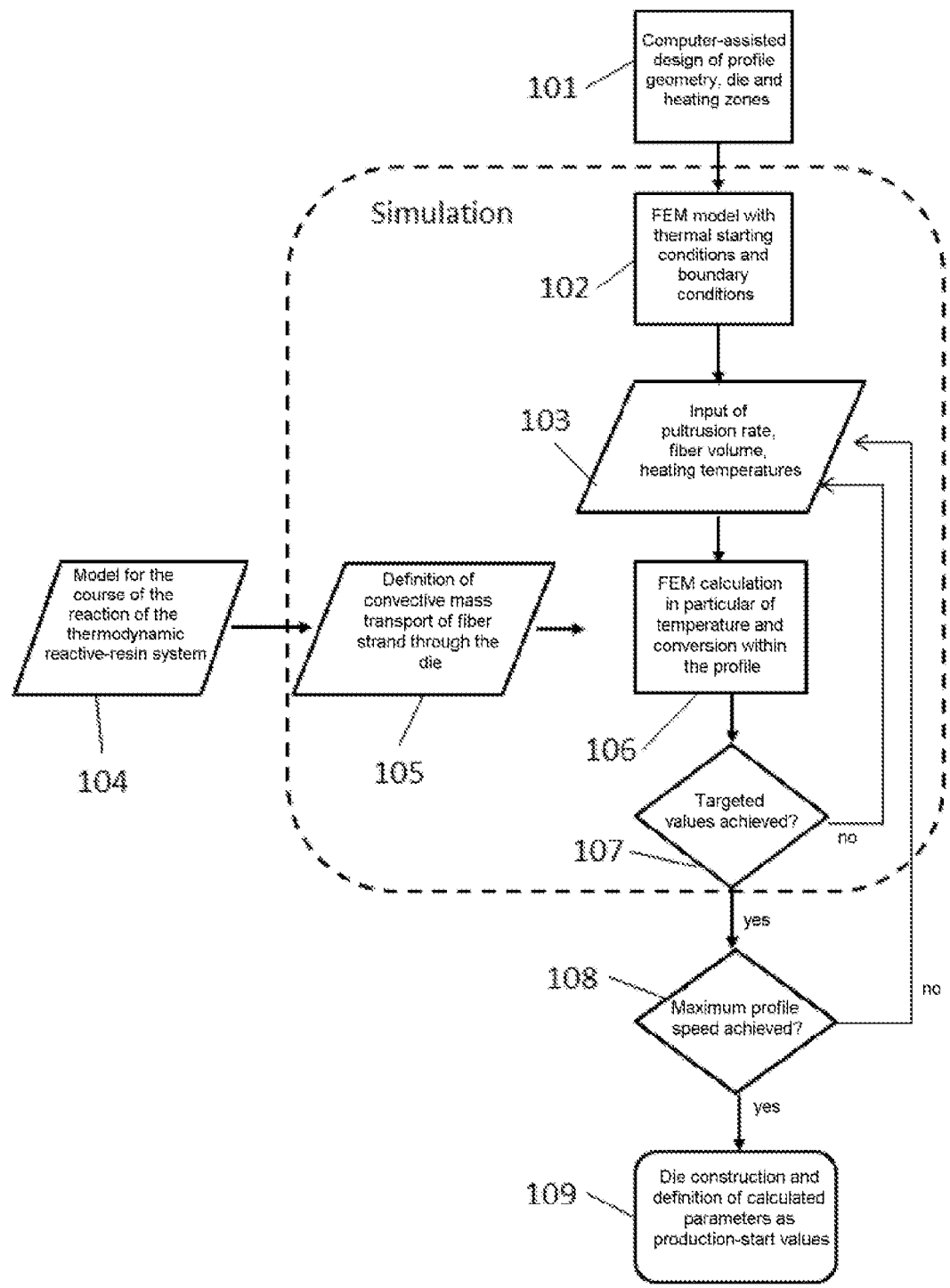

METHOD FOR PRODUCING FIBER-REINFORCED PLASTICS

CROSS-REFERENCE TO RELATED APPLICATION

This application is a National Phase Application of PCT/EP2020/061427, filed Apr. 24, 2020, which claims priority to European Application No. 19171509.3 filed Apr. 29, 2019, each of which is being incorporated herein by reference.

FIELD

The present invention relates to a pultrusion method for the production of fiber-reinforced plastics, where conduct of said process is improved via computer-assisted simulations and by a suitable underlying thermodynamic model.

BACKGROUND

Productivity plays a very important part in the pultrusion process in respect of the cost-effectiveness of the method. By increasing the production rate it is possible to achieve higher output per unit of time, thus reducing production costs. For optimization of the process it is therefore essential to understand how production rate can be increased and to identify and implement corresponding chemical, technological or processing measures for that purpose.

The pultrusion process continuously produces fiber-reinforced profiles with a thermoset matrix. For this purpose, unidirectional fiber strands, known as rovings, and sometimes additional reinforcement textiles, for example random fiber mats or woven fabrics, made of glass fiber, of carbon fiber, of aramid fiber or of basalt fiber, are drawn off from rolls and firstly drawn through an injection box or a resin bath, where the fibers are saturated with an unreacted liquid reaction mixture. The saturated fiber strand is then drawn through a heated die in which the reaction mixture is shaped and hardened. A take-off unit ensures continuous motion of the fiber strand and, respectively, of the profile.

The saturation of the fibers can per se have a limiting effect on production rate. EP 0 712 716 A1 and EP 3 466 659 A1 relate to pultrusion methods which improve the saturation of the fibers.

In contrast thereto, we consider below the hardening of the reaction mixture in the pultrusion die and the effect of the production rate.

The pultrusion die usually has the same shaping cross section over its entire length, its length typically being about 1 m with, in pultrusion direction, 3 to 6 heating zones in which the temperature can be individually adjusted. The heating zones consist by way of example of electrical-resistance heating elements in the form of plates which are pressed onto the die, above and below same, and if necessary also laterally. The heating plates transfer heat flux into the die, and in turn from there into the moving and saturated fiber strand. The increased temperature in the fiber strand accelerates the chemical reaction of the matrix resin. The objective is to achieve, at the end of the pultrusion die, a hardness level that is sufficiently high to provide a stable profile. However, as production rate increases the residence time of the fiber strand in the heated die decreases, and less time is therefore available for the reaction, and the hardness levels achieved at the end of the die tend to be lower. The temperatures of the heating plates are therefore adjusted as required by the production rate (hotter for higher rates), in order to compensate for the shorter residence time. However, because there is comparatively little conductive heat transfer within the fiber strand, and because of the large proportion of reinforcement fibers that must likewise be heated, there are local differences in the temperatures and therefore also in the level of hardening within the cross section of the fiber strand and, respectively, of the plastics profile. This is particularly noticeable in the case of thick-walled profiles. Increasing non-uniformity of temperature profile and of reaction-conversion profile in the fiber strand increases the probability of occurrence of component defects such as warpage or cracks. This effect is further amplified by any further increase of exterior die temperatures. In order to avoid decomposition of the matrix, furthermore, it is essential not to exceed certain temperatures therein. The length and position of what is termed the gel zone are also important for the process stability in relation for example to the level of the take-off force. These two criteria are likewise influenced by the pultrusion rates, and also by the die temperatures. There is therefore a conflict of objectives between, on the one hand, production rate and, on the other hand, product quality and, respectively, process quality.

This conflict of objectives is usually resolved by changing pultrusion rate and die temperatures in an iterative process in production trials until a satisfactory processing point has been found. This procedure is associated with considerable cost for time and materials, and must be repeated for each new chemical system, each profile geometry and each die configuration. It is moreover difficult to find an upper pultrusion-rate limit that provides the required component quality. Some component defects moreover become apparent only when some time has elapsed after production, and this can lead to increased rejection of product.

SUMMARY

It would therefore be desirable to develop a method which permits identification of the ideal die temperatures in respect of maximized production rate with sufficiently high component quality without the abovementioned disadvantages.

It was an object to provide a pultrusion method which can maximize production rate in a simple manner while simultaneously retaining the good quality of the resultant product.

Surprisingly, it was possible to achieve this object via a simulation-assisted method which, on the basis of a modeling of the course of the reaction of the reactive plastics system as a function of time and temperature of the pultrusion process, in particular simulates the conductive heat transfer processes in the die, and also the resultant temperature conditions and reaction conditions for any desired positions within the fiber strand. By means of the simulation used according to the invention it is possible to predict, for any desired combinations of product rates and die temperatures, whether compliance is achieved with the required component quality, minimum conversion, maximum temperature, and also with differences in temperature and in conversion that are permissible within the profile. It is moreover possible by the above means to check and optimize the thermal design of the die with different heating plates and with any cores required within the die in order to form hollow chambers in a profile. The abovementioned iterative process can be carried out by means of computer simulation before completion of the die-construction phase. By the above means it was surprisingly possible, by using modern optimization software, for example based on self-learning algorithms, to find an ideal solution and to find the highest possible production rate for a given profile-die configuration. It was possible to apply the solution determined by the method according to the invention to subsequent production in an uncomplicated manner The simulation-assisted method described below can moreover virtually ensure in advance the magnitude of the likely production rate; it is thus possible to provide a better cost estimate for the pultruded profile.

BRIEF DESCRIPTION OF THE DRAWINGS

FIG. 1 is a flow diagram showing how the FEM calculation is carried out according to the invention.

DETAILED DESCRIPTION

The invention provides a pultrusion method for the production of fiber-reinforced plastics profiles based on continuous fibers, on continuous-fiber bundles (rovings) or on semifinished textile products, and on a liquid reactive-resin mixture (reactive plastics system), comprising the steps of:

i) drawing continuous fibers, continuous-fiber bundles or semifinished textile products through an injection box or through a resin bath, ii) charging, into the injection box or the resin bath, the liquid reactive-resin mixture for the saturation of the continuous fibers, of the continuous-fiber bundles or of the semifinished textile products, iii) drawing the saturated continuous fibers, continuous-fiber bundles or semifinished textile products out from the injection box or the resin bath into a chamber of a temperature-controllable die for the hardening of the reactive-resin mixture, with formation of the fiber-reinforced profile, iv) drawing the fiber-reinforced profile out of the chamber, characterized in that a) in at least one preliminary experiment, the components of the reactive-resin mixture are mixed at a start temperature $T_0$ at the time $t_0$, and at at least two further times $t_1$ and $t_2$ the corresponding temperatures $T_1$ and $T_2$, and also the reaction conversion $r_1$ and $r_2$, are determined during the reaction of the components in the reactive-resin mixture, b) the measured values determined in a) are utilized for the determination of the parameters of a prescribed thermodynamic calculation model which describes the time-related changes of temperature and reaction conversion for any desired starting conditions for the reactive-resin mixture used, c) the curing method described in step iii) is simulated in finite element method (FEM) simulation software (e.g. ABAQUS®) with the parameters determined in b) and with the thermodynamic calculation model the thermodynamic calculation model and with the geometric data of the plastics profile, and also of the pultrusion die, d) the simulation carried out in c) is used in an iterative method to determine optimized die temperatures at the entry into the chamber and in further sections of the chamber, said temperatures permitting the highest possible output rate while complying with prescribed quality features, e) the pultrusion is carried out with use of the optimized die temperatures in the chamber.

Prescribed quality features are preferably minimum conversion $r_{min}$ that is intended to be achieved at the end of the chamber in the plastics profile, and/or average conversion $r_{average}$ that is intended to prevail at the end of the chamber on average in the plastics profile, and/or maximum temperature $T_{max}$ that is intended not to be exceeded in the plastics profile at any point in the chamber, and/or maximum temperature difference $\Delta T_{max}$ that is not permitted to be exceeded at the end of the chamber in the plastics profile, and/or maximum conversion difference $\Delta r_{max}$ that is not permitted to be exceeded at the end of the chamber in the plastics profile, and/or length of the gel zone in the die $L_{gel}$ that is intended not to be exceeded, and/or position of the gel zone $x_{gel}$ in the die, said position being intended to lie within a certain region.

The individual steps of the method according to the invention are described in detail below.

It is first necessary to describe the exothermic reaction behavior of the reactive plastics system (reactive-resin mixture) used. Starting from known approaches to the description of reactive systems, a semi-empirical approach which describes the exothermic reactive plastics system was developed on the basis of the following differential equations:

$$dr/dt = k_{tot} \cdot (1-r)^n \tag{1}$$

$$1/k_{tot} = 1/k_{kin} + 1/k_{diff} \tag{2}$$

$$k_{kin} = k_0 \cdot \exp[-E_a/RT] + k_{auto,0} \cdot \exp[-E_{auto}/RT] \cdot r^m \tag{3}$$

$$k_{diff} = k_{diff,0} \cdot \exp[-E_{diff}/RT] \cdot (x_{diff} + (1-x_{diff})/(1+\exp[r-r_{infl}])^p)) \tag{4}$$

$$dT/dt = \Delta T_{ad} \cdot dr/dt \tag{5}$$

The definitions here are as follows:

r is reaction conversion
(calculated and/or measured in step a) and utilized for parameter-determination in the thermodynamic model and simulated in step c))

t is time
(measured in step a) and prescribed in step c))

$k_{tot}$ is overall rate constant
(calculated in step b) and c)) in accordance with equation (2))

n is order of reaction
(parameter calculated in step b))

$k_{kin}$ is kinetic rate constant
(calculated in each case in steps b) and c)) in accordance with equation (3))

$k_{diff}$ is diffusive rate constant
(calculated in each case in steps b) and c)) in accordance with equation (4))

$k_0$ is kinetic pre-exponential factor
(parameter calculated in step b))

$E_a$ is kinetic activation energy
(parameter calculated in step b))

R is universal gas constant

T is temperature of the reactive-resin mixture
(measured in step a) and calculated in step c))

$k_{auto,0}$ is autocatalytic pre-exponential factor
(parameter calculated in step b))

$E_{auto}$ is autocatalytic activation energy
(parameter calculated in step b))

m is autocatalytic exponent
(parameter calculated in step b))

$k_{diff,0}$ is diffusive pre-exponential factor
(parameter calculated in step b))

$E_{diff}$ is diffusive activation energy
(parameter calculated in step b))
$x_{diff}$ is value for the reduction of the diffusive rate constant
(parameter calculated in step b))
$r_{infl}$ is gelling conversion
(parameter calculated in step b))
p is diffusive exponent
(parameter calculated in step b))
$\Delta T_{ad}$ is adiabatic temperature increase
(preferably measured in step a)).

It is also possible to use the following coupled differential equations as alternative thermodynamic calculation model:

$$dr/dt = k_{tot} \cdot (1-r)^n \qquad (1)$$

$$1/k_{tot} = 1/k_{kin} + 1/k_{diff} \qquad (2)$$

$$k_{kin} = k_B T/h 19 \exp[-\Delta H_{kin}/RT + \Delta S_{kin}/R] + k_B T/h \cdot \exp[-\Delta H_{auto}/RT + \Delta S_{auto}/R] \cdot r^m \qquad (3)$$

$$k_{diff} = k_B T/h \cdot \exp[-\Delta H_{diff}/RT + \Delta S_{diff}/R] \cdot (x_{diff} + (1-x_{diff})/(1+(\exp[r-r_{infl}])^p)) \qquad (4)$$

$$dT/dt = \Delta T_{ad} \cdot dr/dt \qquad (5),$$

where
r is reaction conversion
(calculated and/or measured in step a) and utilized in step b) for parameter-determination in the thermodynamic model and simulated in step c))
t is time
(measured in step a) and prescribed in step c))
$k_{tot}$ is overall rate constant
(calculated in step b) and c) in accordance with equation (2))
n is order of reaction
(parameter calculated in step b))
$k_{kin}$ is kinetic rate constant
(calculated in each case in steps b) and c) in accordance with equation (3))
$k_{diff}$ is diffusive rate constant
(calculated in each case in steps b) and c) in accordance with equation (4))
$k_B$ is Boltzmann constant
h is Planck constant
$\Delta H_{kin}$ is kinetic activation enthalpy
(parameter calculated in step b))
$\Delta S_{kin}$ is kinetic activation entropy
(parameter calculated in step b))
R is universal gas constant
T is temperature of the reactive-resin mixture
(measured in step a) and calculated in step c))
$\Delta H_{auto}$ is autocatalytic activation enthalpy
(parameter calculated in step b))
$\Delta S_{auto}$ is autocatalytic activation entropy
(parameter calculated in step b))
m is autocatalytic exponent
(parameter calculated in step b))
$\Delta H_{diff}$ is diffusive activation enthalpy
(parameter calculated in step b))
$\Delta S_{diff}$ is diffusive activation entropy
(parameter calculated in step b))
$x_{diff}$ is value for the reduction of the diffusive rate constant
(parameter calculated in step b))
$r_{infl}$ is gelling conversion
(parameter calculated in step b))
p is diffusive exponent
(parameter calculated in step b))
$\Delta T_{ad}$ is adiabatic temperature increase
(preferably measured in step a))

Before the implementation of step b), the value ranges for the parameters to be calculated must be restricted to physically achievable values. These value ranges can be found in the literature generally available. Values from the abovementioned value ranges are used in the differential equations, and the reaction conversions and temperatures thus calculated are compared with the values measured in step a), and iteration is continued until agreement between the calculated reaction conversions and temperatures and the measured reaction conversions and temperatures is maximized. The differential equations are thus matched to the data measured in step a).

Most of the abovementioned parameters can vary within certain limits in order to match the initially general model to, for example, a specific reactive plastics system. This is achieved with the aid of multiple measurements of temperature and conversion during the reaction of the reactive plastics system that is to be described, in preliminary experiments with various start temperatures (for example 30° C., 40° C., 50° C., 60° C., 70° C., 80° C.). Variation of the parameters of the model leads to identification of those values that best describe the measured temperature curves and conversion curves. Because there is an almost infinitely large number of possible combinations for the parameter values, the ideal solution can by way of example be determined with the aid of what is known as Excel Solver in Microsoft Excel. Excel Solver permits use of multiple start values and an associated gradient method to find a combination of parameter values that minimize the difference between model and measurements by the sum-of-squared-errors method. In near-adiabatic preliminary experiments, the temperature curves and conversion curves are measured for various start temperatures (both material temperature and environment temperature). For this, the reaction mixture is combined and mixed and charged to a thermally insulated vessel, and the temperature is measured in the middle of the vessel during the reaction. Spot measurements at various times can preferably be used for monitoring purposes to monitor the change of reaction conversion during the reaction (e.g. via IR measurements to determine NCO content in the case of a reactive polyurethane system). Alternatively, the conversion can, for example, be determined from the temperature increase $\Delta T_{ad}$ in accordance with equation (5).

If the parameters of the model are intended for a chemical system, the model describes the progress of the reaction of the pure reactive system for any desired temperature curves under adiabatic conditions. However, the actual pultrusion process is many times more complex. The reactive plastics system is mixed with reinforcement fibers and drawn through a heating die with various temperature zones, and therefore the boundary conditions constantly change, and heat transfer takes place from/to the die.

In order to describe this complex process, the simulation model used is the finite element method (FEM), which is widely used in technology. The principles of the simulation sequence are explained in more detail with reference to FIG. 1 below. FIG. 1 is a flow diagram showing how the FEM calculation is carried out according to the invention.

In step 101, the geometry of the pultrusion profile is used in CAD (computer-aided design) software to construct the die required for same, with the various heating plates and with any cores used to form hollow chambers in the profile.

In step 102, the CAD data are used in accordance with the customary prior art to generate a FEM network. For the thermal calculation, the data relating to materials (e.g. heat capacity, thermal conductivity, density) are defined for the die, for the heating plates and for any cores present. In addition, the corresponding boundary conditions (e.g. temperatures, heat flux values, heat transfer coefficients) are defined for all areas where heat-exchange occurs. Another factor that must, of course, also be taken into account is reciprocal heat exchange between the components, for example between the heating plates and the die and between the die and the pultrusion profile.

In step 103, the starting conditions are defined, e.g. the temperatures or heating capacities of the various heating plates, the die and the pultrusion rate.

As described in step iii), the semifinished product is drawn from the injection box or the resin bath into a chamber of the temperature-controllable die for the hardening of the reactive-resin mixture with formation of the fiber-reinforced profile. The transport of the material of the fiber-reinforced profile through the chamber of the die is therefore simulated in step 105 as convective mass transport through the stationary die. The mass transport rate is defined via the definition of the pultrusion rate in step 103.

The heat flux is transferred from the heating plates into the die, and from there in turn into the moving and saturated fiber strand. The increased temperature in the fiber strand accelerates the chemical reaction of the matrix resin, whereupon in turn the reaction liberates heat because it is exothermic, and leads to a further temperature increase in the fiber strand. A thermodynamic model for the course of the reaction of the reactive plastics system is therefore required for the mathematical description in step 104. The semiempirical approach in the equations (1) to (5) proved to be particularly advantageous. In step 105, said approach is integrated within commercial FEM software, e.g. ABAQUS®. In ABAQUS® the equations can be modeled in what are known as "User Subroutines" taking account of the convective mass transport of the fiber strand, where these describe only the chemical reaction of the plastics matrix. The fibers themselves do not participate in the reaction; nor, however, do they absorb heat in accordance with their proportion by volume in the total volume of fiber plus matrix, and in accordance with their density, heat capacity and thermal conductivity.

In step 106, the actual FEM calculation of the heat exchange of the participating components (heating plates, die, any cores used and fiber strand) takes place, using the known physical laws for the description of heat-transport processes and heating processes, taking particular account of the motion, defined in step 105, of the fiber strand through the die.

The simulation provides not only the curve for reaction conversion r and temperature T for a defined point within the fiber strand (e.g. center of profile, corner of profile) along the die but also distribution thereof within the cross section of the profile for a defined position in pultrusion direction. It should in particular be noted that at a defined position in production direction (for example 0.5 m after entry at the fiber strand into the chamber) the reaction conversion and temperature prevailing are not the same within the entire profile cross section; instead, it is possible by way of example that temperature and reaction conversion prevailing are higher at the edge of the profile than in the center of the profile, or vice versa.

The values calculated for temperature and reaction conversion in the fiber strand/plastics profile part can be used to determine the quality features defined below, on the basis of which it is possible to assess and compare the quality of the process, and also of the resultant profile. Another important factor, alongside the values for reaction conversion, and also the temperature at a defined position in pultrusion direction, is the length and position of what is known as the gel zone. When the gelling conversion $r_{infl}$ is reached, a reaction mixture changes from the liquid to the solid state. The gel zone is that region in the pultrusion die where the reaction mixture achieves gelling conversion. Because gelling conversion is achieved at various points in the profile cross section at different positions along the length of the pultrusion die, the gel zone is an elongate three-dimensional area. The length of the gel zone indicates how far this area has extended in pultrusion direction. The position of the gel zone indicates where this area lies within the pultrusion die.

The simulation model, with the underlying material model, can be used as described above to optimize the process parameters. For the optimization, quality features are defined, the intention being to achieve at least one, or a plurality, of those features. These can by way of example be:

Minimum conversion $r_{min}$, which is intended to be at least achieved at the end of the chamber at all points of the cross section in plastics profile;

Average conversion $r_{average}$, which is intended to prevail on average at the end of the chamber in the plastics profile. The average conversion is the average value of all of the reaction conversion values in the cross section of the plastics profile;

maximum conversion difference $\Delta r_{max}$, which is not permitted to be exceeded at the end of the chamber in the plastics profile. The conversion difference is the difference between the largest and the smallest conversion value in the profile cross section;

maximum temperature $T_{max}$, which is intended not to be exceeded at any point in the chamber;

maximum temperature difference $\Delta T_{max}$, which is not permitted to be exceeded at the end of the chamber in the plastics profile. The temperature difference is the difference between the highest and lowest temperature value in the profile cross section;

length of the gel zone in the die $L_{gel}$, which is intended not to be exceeded. The length of the gel zone indicates how far the three-dimensional area within which every point in the profile cross section achieved gel conversion is extended in pultrusion direction; and/or position of the gel zone $x_{gel}$ within the die, this zone being intended to lie within a defined region.

The position of the gel zone indicates the position, within the pultrusion die, of the three-dimensional area within which every point in the profile cross section achieves gel conversion.

For individual, or all, quality features it is possible to prescribe numerical values which are dependent on the reactive plastics system which experience has shown to lead to the required component quality and, respectively, process stability. These values form the target values for the simulation and, respectively, optimization.

Step 107 comprises a comparison indicating the extent to which the result in step 106 complies with the targeted values. If the targeted values are not achieved, the calculation is repeated, starting at step 103, with changed definitions in particular of the heating-plate temperatures.

If no calculated temperature variant leads to the objective, the most recently successful pultrusion rate, with the associated temperature distribution along the heating zones, is passed onward from step 108 to step 109, so that these values can be utilized for the start of production.

If there is a temperature combination in step 107 that complies with the targeted values, the pultrusion rate is increased in step 108, and the calculation is repeated from point 103.

The optimization described (simulation in accordance with step c) and iteration in accordance with step d)) can be achieved in at least two modes:

i) manual mode: this mode begins by studying the effect of change of individual process parameters (for example increasing the heating-plate temperature in zone 2), and also of simultaneous change of a plurality of process parameters, on the simulation result. This load can be implemented for a variety of production rates. On the basis of constant comparison between the simulation results and the targeted values in step 107 it is possible to identify and change specifically those parameters that have a favorable effect on the targeted values. Repeated iteration is thus used to find at least one advantageous solution to the maximization of production rate.

ii) automated and software-assisted mode: commercially available software (for example optiSLang) can also be used to carry out the manual iteration and optimization described in i). The software automatically carries out the following sequence of steps: "definition of process parameters (103)"—"calculation of conversion and temperature with the simulation model (106)"—"comparison with the targeted values (107) and increase of pultrusion rate (108)"—"definition of new process parameters for the next simulation (103)". Some software is capable, for example by using a self-learning algorithm, of automatically determining the relationships between the process parameters and the simulation result, and thus finding an ideal solution.

From the FEM simulation it is also possible to obtain other important insights, e.g. whether the performance, number and length of the heating zones is adequate. It is equally possible, with the aid of a non-stationary calculation, to estimate the required time from start-up condition at the start of production to achievement of stationary-state production operation. It is thus possible to assess the effectiveness of technical measures such as increase of heating capacity, reduction of heat losses from the die surfaces and heating-plate surfaces, on the shortening of said start-up phase.

After the abovementioned calculations and simulations, the pultrusion process is carried out in the following manner for the production of fiber reinforced plastics pultrudates:

Continuous fibers, continuous-fiber bundles or semifinished textile products are drawn through an injection box or a resin bath. The liquid reactive-resin mixture for the saturation of the continuous fibers, of the continuous-fiber bundles or of the semifinished textile products is charged to the injection box or the resin bath. The saturated continuous fibers, continuous-fiber bundles or semifinished textile products are drawn from the injection box on the resin bath into a chamber of a temperature-controllable die for the hardening of the reactive-resin mixture with formation of the fiber-reinforced profile. During the above, the temperatures along the length of the die are adjusted in accordance with the calculated temperatures, and the calculated take-off rate is set. The fiber-reinforced profile is drawn out of the chamber and, after cooling, cut to a desired length.

For the purposes of this application, the expression "continuous fibers" means fibers known to those skilled in the art, for example inorganic fibers, organic fibers, metallic fibers, natural fibers, preferably glass fibers and carbon fibers, particularly preferably glass fibers. The expression "continuous fiber" implies a fiber material that has a length of at least a plurality of meters. Said fibers are unwound, for example from rolls or spools. Fiber material that can be used here comprises individual fibers, known as fiber rovings, braided fibers, fiber mats, laid fiber scrims and woven fiber fabrics. In particular in the case of fiber composites such as braided fibers, twisted fibers or woven fiber fabrics it is possible that shorter individual fibers can also be present among the individual fibers present in these fiber composites. However, the fiber composite itself must take the form of continuous material. In a preferred embodiment of the invention, the glass fibers are used in the form of fiber rovings.

For the production of the plastics profiles it is preferable to use liquid reactive-resin mixtures based on reactive polyurethane mixtures or polyisocyanurate mixtures. Such reactive polyurethane mixtures preferably comprise a polyisocyanate component (A), a polyol component (B) composed of b1) polyols b2) optionally chain extenders and/or crosslinking agents, b3) optionally catalysts, b4) optionally auxiliaries and/or additives, and internal release agents (C).

Polyurethane pultrudates preferably have 40-80% by volume of continuous fibers. The density of the polyurethane resin is preferably >1.05 g/cm$^3$.

Reactive polyurethane mixtures that can be used for the pultrusion method are well known from, and described in detail in, the literature.

Liquid polyisocyanurate mixtures that can be used for the pultrusion method can by way of example be organic aliphatic and/or aromatic polyisocyanates.

The invention will be explained in more detail with reference to the example below.

Examples

The following reactive polyurethane system was used:

100 parts by weight of polyether polyol mixture composed of 28.5% by weight of glycerol-started polyether based on propylene oxide (OH number 235 mg KOH/g), 26% by weight of glycerol-started polyether based on propylene oxide (OH number 1050 mg KOH/g), 23.8% by weight of glycerol-started polyether based on propylene oxide (OH number 400 mg KOH/g), 9.8% by weight of propylene-glycol-started polyether based on propylene oxide (OH number 28 mg KOH/g) and 9.3% by weight of propylene-glycol started polyether based on propylene oxide (OH number 515 mg KOH/g), and also 2% by weight of MOLSIV® L—powder from UOP (potassium calcium sodium aluminosilicate of zeolite type A) and 0.67% by weight of diisooctyl 2,2'-[(dioctylstannylene)bis(thio)]diacetate as catalyst (e.g. Formrez UL-29).

135 parts by weight of a mixture composed of monomeric and polymeric diphenylmethanediisocyanate (MDI) with viscosity about 290 mPa*s at 20° C., functionality of 2.9 and NCO content of 31.4%.

4 parts by weight of Tech-Lube HB-550-D (internal release agent).

The following were used as continuous fibers: Unidirectional glassfiber rovings with linear density 4800 tex. The fiber content by weight of the simulated profile was 80%.

As described above, the time-related change of temperature, and also of reaction conversion during the chemical reaction of the polyurethane system used, was measured in preliminary experiments at the starting temperatures 30° C., 40° C., 50° C., 60° C., 70° C. and 80° C. Excel Solver was used to determine those parameters of the predefined thermodynamic model that best describe the time-related change of the temperature in the reactive-resin mixture and of the reaction conversion.

The ideal parameters for describing the polyurethane system used are:

| # | Parameter | Unit | Value |
|---|---|---|---|
| 1 | R | — | variable |
| 2 | t | s | variable |
| 3 | $k_{tot}$ | 1/s | calculated in accordance with equation (2) |
| 4 | n | — | 2 |
| 5 | $k_{kin}$ | 1/s | calculated in accordance with equation (3) |
| 6 | $k_{diff}$ | 1/s | calculated in accordance with equation (4) |
| 7 | $k_0$ | 1/s | 20.28387 |
| 8 | $E_a$ | J/mol | 25 000 |
| 9 | R | (kg*m$^2$)/(s$^2$*mol*K) | 8.3144598 |
| 10 | T | K | variable |
| 11 | $k_{auto, 0}$ | 1/s | 3.85687 |
| 12 | $E_{auto}$ | J/mol | 8385.2322 |
| 13 | M | — | 2.44892 |
| 14 | $k_{diff, 0}$ | 1/s | 3.54*10$^{12}$ |
| 15 | $E_{diff}$ | J/mol | 98 966.07361 |
| 16 | $x_{diff}$ | — | 0 |
| 17 | $r_{infl}$ | — | 0.86789 |
| 18 | P | — | 100 |
| 19 | $\Delta T_{ad}$ | K | 154.16321 |

A pultrusion die, including the electrical heating elements, was then modeled in the ABAQUS® FEM simulation software. The model comprises the following details:
- length of the pultrusion die: 1000 mm
- height of the pultrusion die: 90 mm
- width of the pultrusion die: 220 mm
- geometry of the profile manufactured by the pultrusion die: Rectangular profile with width 115 mm and thickness 3 mm
- 12 heating elements each 75 mm long, with 6 above and 6 below facing one another and distributed over the length of the pultrusion die. The temperatures of the heating plates located at the same longitudinal position in the production trial were set to be identical; this leads to 6 mutually independent heating-zone temperatures.

The FEM simulation model of the pultrusion die, the prescribed thermodynamic model determined, and the defined heating-plate temperatures, the fiber content by volume of the resultant profile, and also the pultrusion rate, were used to calculate the time-related and, respectively, position-related change of temperature and of reaction conversion during passage of the fiber strand through the pultrusion die.

For evaluation of the simulation model, the calculated curves for the temperature for various positions within the profile, and also two different pultrusion rates, were compared with measurements of the temperature in the actual process.

The comparison revealed only a minor difference between simulation and measurement, and it can therefore be assumed that the simulation model provides a sufficiently accurate description of reality.

A total of three simulations as described above were carried out by way of example with the ABAQUS® R2016x HotFix 9 FEM software from Dassault Systèmes, France, with different process parameters. The parameters were:

| Simulation | Production rate [m/min] | HT1 [° C.] | HT2 [° C.] | HT3 [° C.] | HT4 [° C.] | HT5 [° C.] | HT6 [° C.] |
|---|---|---|---|---|---|---|---|
| #1 | 0.5 | 60 | 140 | 160 | 180 | 180 | 170 |
| #2 | 1.5 | 60 | 140 | 160 | 180 | 180 | 170 |
| #3 | 1.5 | 80 | 160 | 180 | 200 | 190 | 180 |

The value HT1 is the temperature of the heating plates located at the ingoing end of the die, where the fiber strand enters the chamber of the die. HT2 is the temperature of the next heating plates in production direction, and so on. HT6 is the temperature of the heating plates at the end of the die, where the fiber strand is discharged from the chamber of the die.

The production rate in simulation #2 was higher than in #1. The heating-zone temperatures in simulation #3 were higher than in #2. The objective was to permit maximized production rate with no adverse effect on the prescribed quality features.

The prescribed initial temperature for the fiber strand on entry into the chamber of the die was 25° C., and the prescribed initial reaction conversion was 0.

The following values were described as targeted values:
average conversion in discharge cross section $r_{average} > 0.8$
maximum temperature intended not to be exceeded in the profile cross section at any point in the die, $T_{max} < 200°$ C.

The average conversion $r_{average,1}$ calculated in the discharge cross section in simulation #1 at a production rate of 0.5 m/min was 0.9. The maximum temperature in the die $T_{max,1}$ was 178.9° C. Both targeted values were therefore achieved. However, if the production rate was increased to 1.5 m/min at the same temperatures of the heating zones (simulation #2), the average conversion $r_{average,2}$ achieved was then only 0.76. This conversion was below the prescribed target value. The maximum temperature $T_{max,2}$ was 181.1° C. In order nevertheless to achieve the prescribed conversion at a production rate of 1.5 m/min, the heating-zone temperatures were increased in simulation #3. This led to a calculated conversion $r_{average,3}$ of 0.84 and therefore to achievement of the prescribed target value. The maximum temperature $T_{max,3}$ was 195.7° C., and was therefore below the upper limit of 200° C. By virtue of the procedure according to the invention it was therefore possible to identify optimized temperature settings for this die which allowed an increase of the production rate while complying with the targeted values. With the optimized die temperatures it was possible to achieve successful conduct of pultrusion and to obtain a high-quality pultrudate.

What is claimed is:

1. A pultrusion method for the production of fiber-reinforced plastics profiles based on continuous fibers, on continuous-fiber bundles or on semifinished textile products, and on a liquid reactive-resin mixture, comprising:
   i) drawing continuous fibers, continuous-fiber bundles or semifinished textile products through an injection box or a resin bath,
   ii) charging, into the injection box or the resin bath, the liquid reactive-resin mixture to saturate the continuous fibers, the continuous-fiber bundles or the semifinished textile products,
   iii) drawing the saturated continuous fibers, continuous-fiber bundles or semifinished textile products from the injection box or the resin bath into a chamber of a temperature-controllable die for the exothermic hardening of the reactive-resin mixture to form of the fiber-reinforced profile, and
   iv) drawing the fiber-reinforced profile out of the chamber, wherein
     a) in at least one preliminary experiment, the components of the reactive-resin mixture are mixed at a start temperature $T_0$ at a time $t_0$, and at at least two further times $t_1$ and $t_2$ corresponding temperatures $T_1$ and $T_2$ are determined, and also reaction conversions $r_1$ and $r_2$ are determined during the exothermic reaction of the components in the reactive-resin mixture,
     b) the measured values determined in a) are utilized for the determination of the parameters of a prescribed thermodynamic calculation model which describes the time-related changes of temperature and reaction conversion for any desired starting conditions for the reactive-resin mixture used,
     c) the exothermic curing method described in step iii) is simulated in finite element method simulation software with the parameters determined in b) and with the thermodynamic calculation model and with the geometric data of the plastics profile and of the pultrusion die,
     d) the simulation carried out in c) is used in an iterative method to determine optimized die temperatures at the entry into the chamber and in further sections of the chamber, said temperatures permitting the highest possible output rate while complying with prescribed quality features, and
     e) the pultrusion is carried out with use of the optimized die temperatures in the chamber.

2. The pultrusion method as claimed in claim 1, wherein step a) comprises:
   a1) controlling the temperature of the components of the reactive-resin mixture to the temperature $T_0$, and mixing said components at this temperature at the time $t_0$,
   a2) measuring, at at least two further times $t_1$ and $t_2$, the corresponding temperatures $T_1$ and $T_2$, and
   a3) calculating and/or measuring at least two reaction conversions $r_1$ and $r_2$ during the reaction, either at the times specified in a2) or at other times,
   wherein in order to obtain the measurement data for the preliminary experiment, the step a) is carried out at least once for initial temperatures differing from $T_0$.

3. The pultrusion method as claimed in claim 1, wherein the following coupled differential equations are used as thermodynamic calculation model in step b):

$$dr/dt = k_{tot} \cdot (1-r)^n \quad (1)$$

$$1/k_{tot} = 1/k_{kin} + 1/k_{diff} \quad (2)$$

$$k_{kin} = k_0 \cdot \exp[-E_a/RT] + k_{auto,0} \cdot \exp[-E_{auto}/RT] \cdot r^m \quad (3)$$

$$k_{diff} = k_{diff,0} \cdot \exp[-E_{diff}/RT] \cdot (x_{diff} + (1-x_{diff})/(1+(\exp[r-r_{infl}])^p)) \quad (4)$$

$$dT/dt = \Delta T_{ad} \cdot dr/dt \quad (5)$$

where
r is reaction conversion (calculated and/or measured in step a) and utilized in step b) for parameter-determination in the thermodynamic model and simulated in step c)),
t is time (measured in step a) and prescribed in step c)),
$k_{tot}$ is overall rate constant (calculated in step b) and c) in accordance with equation (2)),
n is order of reaction (parameter calculated in step b)),
$k_{kin}$ is kinetic rate constant (in each case calculated in steps b) and c) in accordance with equation (3)),
$k_{diff}$ is diffusive rate constant (calculated in each case in steps b) and c) in accordance with equation (4)),
$k_0$ is kinetic pre-exponential factor (parameter calculated in step b)),
$E_a$ is kinetic activation energy (parameter calculated in step b)),
R is universal gas constant,
T is temperature of the reactive-resin mixture (measured in step a) and calculated in step c)),
$k_{auto,0}$ is autocatalytic pre-exponential factor (parameter calculated in step b)),
$E_{auto}$ is autocatalytic activation energy (parameter calculated in step b)),
m is autocatalytic exponent (parameter calculated in step b)),
$k_{diff,0}$ is diffusive pre-exponential factor (parameter calculated in step b)),
$E_{diff}$ is diffusive activation energy (parameter calculated in step b)),
$x_{diff}$ is value for the reduction of the diffusive rate constant (parameter calculated in step b)),
$r_{infl}$ is gelling conversion (parameter calculated in step b)),
p is diffusive exponent (parameter calculated in step b)), and
$\Delta T_{ad}$ is adiabatic temperature increase (preferably measured in step a)),
and the values thus calculated are compared with the values measured in step a), and the procedure is iterated until agreement between the calculated values and the measured values is maximized.

4. The pultrusion method as claimed in claim 1, wherein the following coupled differential equations are used as thermodynamic calculation model in step b):

$$dr/dt = k_{tot} \cdot (1-r)^n \quad (1)$$

$$1/k_{tot} = 1/k_{kin} + 1/k_{diff} \quad (2)$$

$$k_{kin}=k_BT/h19\exp[-\Delta H_{kin}/RT+\Delta S_{kin}/R]+k_BT/h\cdot\exp[-\Delta H_{auto}/RT+\Delta S_{auto}/R]\cdot r^m \quad (3)$$

$$k_{diff}=k_BT/h\cdot\exp[-\Delta H_{diff}/RT+\Delta S_{diff}/R]\cdot(x_{diff}+(1-x_{diff})/(1+(\exp[r-r_{infl}])^p)) \quad (4)$$

$$dT/dt=\Delta T_{ad}\cdot dr/dt \quad (5),$$

where r is reaction conversion (calculated and/or measured in step a) and utilized in step b) for parameter-determination in the thermodynamic model and simulated in step c)), t is time (measured in step a) and prescribed in step c)), $k_{tot}$ is overall rate constant (calculated in step b) and c) in accordance with equation (2)), n is order of reaction (parameter calculated in step b)), $k_{kin}$ is kinetic rate constant (calculated in each case in steps b) and c) in accordance with equation (3)), $k_{diff}$ is diffusive rate constant (calculated in each case in steps b) and c) in accordance with equation (4)), $k_B$ is Boltzmann constant, h is Planck constant, $\Delta H_{kin}$ is kinetic activation enthalpy (parameter calculated in step b)), $\Delta S_{kin}$ is kinetic activation entropy (parameter calculated in step b)), R is universal gas constant, T is temperature of the reactive-resin mixture (measured in step a) and calculated in step c)), $\Delta H_{auto}$ is autocatalytic activation enthalpy (parameter calculated in step b), $\Delta S_{auto}$ is autocatalytic activation entropy (parameter calculated in step b)), m is autocatalytic exponent (parameter calculated in step b)), $\Delta H_{diff}$ is diffusive activation enthalpy (parameter calculated in step b)), $\Delta S_{diff}$ is diffusive activation entropy (parameter calculated in step b)), $x_{diff}$ is value for the reduction of the diffusive rate constant (parameter calculated in step b)), $r_{infl}$ is gelling conversion (parameter calculated in step b)), p is diffusive exponent (parameter calculated in step b)), and $\Delta T_{ad}$ is adiabatic temperature increase (preferably measured in step a)), and the values thus calculated are compared with the values measured in step a), and the procedure is iterated until agreement between the calculated values and the measured values is maximized.

5. The pultrusion method as claimed in claim 1, wherein the prescribed quality features are:
(1) minimum conversion $r_{min}$ that is intended to be achieved at the end of the chamber in the plastics profile,
(2) average conversion $r_{average}$ that is intended to prevail on average at the end of the chamber in the plastics profile,
(3) maximum temperature $T_{max}$ that is intended not to be exceeded in the plastics profile at any point in the chamber,
(4) maximum temperature difference $\Delta T_{max}$ that is not permitted to be exceeded at the end of the chamber in the plastics profile,
(5) maximum conversion difference $\Delta r_{max}$ that is not permitted to be exceeded at the end of the chamber in the plastics profile,
(6) length of the gel zone in the die $L_{gel}$ that is not intended to be exceeded,
(7) position of the gel zone $x_{gel}$ in the die, said position being intended to lie within a certain region, or
(8) a combination of any two or more thereof.

6. The pultrusion method as claimed in claim 1, wherein the liquid reactive-resin mixture is a reactive polyurethane mixture based on organic aliphatic and/or aromatic polyisocyanates and compounds having at least two groups reactive toward isocyanate groups.

7. The pultrusion method as claimed in claim 1, wherein the liquid reactive-resin mixture is a reactive polyisocyanurate mixture based on organic aliphatic and/or aromatic polyisocyanates.

* * * * *

UNITED STATES PATENT AND TRADEMARK OFFICE
CERTIFICATE OF CORRECTION

PATENT NO. : 11,833,767 B2
APPLICATION NO. : 17/607193
DATED : December 5, 2023
INVENTOR(S) : Sascha Froebel et al.

Page 1 of 1

It is certified that error appears in the above-identified patent and that said Letters Patent is hereby corrected as shown below:

In the Claims

In Claim 1 at Column 13, Line 30, please remove "of" next to the word "form".

In Claim 4 at Column 15, Line 1, please remove the insertion of "19" in the formula.

Signed and Sealed this
Ninth Day of January, 2024

Katherine Kelly Vidal
*Director of the United States Patent and Trademark Office*